United States Patent
Bala et al.

(10) Patent No.: US 9,094,957 B2
(45) Date of Patent: *Jul. 28, 2015

(54) CONTROL CHANNEL SIGNALING AND ACQUISITION FOR CARRIER AGGREGATION

(71) Applicant: INTERDIGTAL PATENT HOLDINGS, INC., Wilmington, DE (US)

(72) Inventors: Erdem Bala, Farmingdale, NY (US); Guodong Zhang, Syosset, NY (US); Philip J. Pietraski, Jericho, NY (US); Sung-Hyuk Shin, Northvale, NJ (US); Peter S. Wang, E. Setauket, NY (US); Marian Rudolf, Montreal (CA); Joseph S. Levy, Merrick, NY (US); Donald M. Grieco, Manhasset, NY (US); Shankar Somasundaram, Sunnyvale, CA (US); Kyle Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,153

(22) Filed: Feb. 26, 2014

(65) Prior Publication Data

US 2014/0179328 A1    Jun. 26, 2014

Related U.S. Application Data

(63) Continuation of application No. 12/582,459, filed on Oct. 20, 2009, now Pat. No. 8,705,461.

(60) Provisional application No. 61/157,758, filed on Mar. 5, 2009, provisional application No. 61/142,429, filed on Jan. 5, 2009, provisional application No. 61/111,573, filed on Nov. 5, 2008, provisional application No. 61/106,810, filed on Oct. 20, 2008.

(51) Int. Cl.
*H04W 4/00* (2009.01)
*H04W 72/04* (2009.01)
(Continued)

(52) U.S. Cl.
CPC ............. *H04W 72/04* (2013.01); *H04L 5/0007* (2013.01); *H04L 5/0092* (2013.01); *H04L 5/0094* (2013.01); *H04W 72/02* (2013.01); *H04W 48/12* (2013.01); *H04W 72/042* (2013.01)

(58) Field of Classification Search
CPC ....... H04L 5/0007; H04L 5/00; H04L 5/0094; H04L 5/0098
USPC ............ 455/73, 450, 509; 370/329, 336, 345, 370/450, 352, 328
See application file for complete search history.

(56) References Cited

U.S. PATENT DOCUMENTS 4,797,879 A    1/1989   Habbab et al.
(Continued)

FOREIGN PATENT DOCUMENTS

EP    1 758 273 A1    2/2007
GB    2 439 367 A     12/2007
(Continued)

OTHER PUBLICATIONS

Mouly, et al., The Frequency Axis, The GSM System for Mobile Communications—Slow Frequency Hopping SFH, Jan. 1993, pp. 217-227.
(Continued)

*Primary Examiner* — Nay A Maung
*Assistant Examiner* — Angelica M Perez
(74) *Attorney, Agent, or Firm* — Condo Roccia Koptiw LLP

(57) ABSTRACT

A method and apparatus for handling a control channel for carrier aggregation in wireless communications. The method includes determining which component carrier to listen to, detecting the downlink control channel, processing mapping information related to downlink and uplink transmissions and operating discontinuous reception with respect to carrier aggregation. The method also includes detecting a component carrier, determining the component carrier type and locating the anchor component carrier, if necessary, where the anchor component carrier carries the carrier aggregation information.

20 Claims, 3 Drawing Sheets

(51) Int. Cl.
*H04L 5/00* (2006.01)
*H04W 72/02* (2009.01)
*H04W 48/12* (2009.01)

(56) References Cited

U.S. PATENT DOCUMENTS

| | | | |
|---|---|---|---|
| 8,200,252 B2* | 6/2012 | Lee et al. | 455/458 |
| 8,305,998 B2 | 11/2012 | Marinier et al. | |
| 8,385,281 B2 | 2/2013 | Pan et al. | |
| RE44,203 E | 5/2013 | Chun et al. | |
| 8,705,461 B2* | 4/2014 | Bala et al. | 370/329 |
| 2003/0123470 A1 | 7/2003 | Kim et al. | |
| 2005/0015703 A1 | 1/2005 | Terry et al. | |
| 2005/0036474 A1 | 2/2005 | Zhang et al. | |
| 2005/0221861 A1 | 10/2005 | Zeira | |
| 2006/0056360 A1 | 3/2006 | Parkvall et al. | |
| 2006/0240831 A1 | 10/2006 | Toskala et al. | |
| 2006/0274712 A1 | 12/2006 | Malladi et al. | |
| 2007/0049305 A1 | 3/2007 | Bachl et al. | |
| 2008/0004008 A1 | 1/2008 | Nicol et al. | |
| 2009/0088148 A1 | 4/2009 | Chung et al. | |
| 2009/0154607 A1 | 6/2009 | Lindoff et al. | |
| 2009/0209247 A1* | 8/2009 | Lee et al. | 455/422.1 |
| 2009/0245212 A1* | 10/2009 | Sambhwani et al. | 370/336 |
| 2009/0316659 A1* | 12/2009 | Lindoff et al. | 370/332 |
| 2011/0081856 A1* | 4/2011 | Johansson et al. | 455/7 |
| 2011/0141878 A1 | 6/2011 | Che et al. | |
| 2011/0143796 A1 | 6/2011 | Lee et al. | |
| 2012/0093097 A1* | 4/2012 | Che et al. | 370/329 |
| 2013/0028123 A1 | 1/2013 | Marinier et al. | |
| 2013/0142178 A1 | 6/2013 | Kim et al. | |

FOREIGN PATENT DOCUMENTS

| | | |
|---|---|---|
| JP | 2010-532962 A | 8/2008 |
| JP | 2009-506635 A | 2/2009 |
| JP | 2010-515985 A | 5/2010 |
| WO | WO 02/35873 A2 | 5/2002 |
| WO | WO 2006/126079 A2 | 11/2006 |
| WO | WO 2008/114977 A1 | 9/2008 |
| WO | WO 2009/025525 A1 | 2/2009 |
| WO | WO 2010/051511 A2 | 5/2010 |

OTHER PUBLICATIONS

Zoran, et al., Performance and Implementation of Dynamic Frequency Hopping in Limited-Bandwidth Cellular Systems, IEEE Transactions on Wireless Communications, IEEE Service Center, vol. 1, No. 1, Jan. 2002, pp. 28-36.

Yu, Feng, Technical Research of HARQ in HSUPA System, Wanfang Academic Journal Database, Nov. 21, 2007.

Linghua, Jin, Research on VoLP Capacity Based on HSUPA System, Wanfang Academic Journal Database, Feb. 29, 2008.

3rd Generation Partnership Project (3GPP), TS 25.211 V8.2.0, "3rd Generation Partnership Project; Technical Specification Group Radio Access Network; Physical Channels and Mapping of Transport Channels Onto Physical Channels (FOD) (Release 8)", Sep. 2008, 56 pages.

3rd Generation Partnership Project (3GPP), TS 25.308 V8.3.0, "3rd Generation Partnership Project; Technical Specification Group Radio Access Network; High Speed Downlink Packet Access (HSDPA); Overall Description; Stage 2 (Release 8)," TS 25.308 V8.3.0, (Sep. 2008), 56 pages.

3rd Generation Partnership Project (3GPP), TS 25.211 V8.5.0, "3rd Generation Partnership Project (3GPP); Technical Specification Group Radio Access Network; Physical channels and mapping of transport channels onto physical channels (FDD) (Release 8),", Sep. 2009, 56 pages.

3rd Generation Partnership Project (3GPP), TS 25.211 V9.0.0, "3rd Generation Partnership Project (3GPP); Technical Specification Group Radio Access Network; Physical channels and mapping of transport channels onto physical channels (FDD) (Release 9),", Sep. 2009, 56 pages.

3rd Generation Partnership Project (3GPP), TS 25.308 V8.7.0, "3rd Generation Partnership Project; Technical Specification Group Radio Access Network; High Speed Downlink Packet Access (HSDPA); Overall description; Stage 2 (Release 8),", Sep. 2009, 65 pages.

3rd Generation Partnership Project (3GPP), TS 25.308 V9.1.0, "3rd Generation Partnership Project; Technical Specification Group Radio Access Network; High Speed Downlink Packet Access (HSDPA); Overall description; Stage 2 (Release 9),", Sep. 2009, 65 pages.

3rd Generation Partnership Project (3GPP), R1-083313, "Introducing Dynamic Carrier Switching in DC-HSDPA", QUALCOMM Europe, 3GPP TSG-RAN WG1 #54, Jeju Island, South Korea, Aug. 18-22, 2008, 5 pages.

3rd Generation Partnership Project (3GPP), R2-084403, "Cell Search and Association Carriers", QUALCOMM Europe, 3GPP TSG-RAN WG2, Meeting #63, Jeju Island, Korea, Aug. 18-22, 2008, 4 pages.

3rd Generation Partnership Project (3GPP), R2-084631, "Measurement Scheme Consideration of Dual-Cell Mobility", Huawei, 3GPP TSG RAN WG2 Meeting #63, Jeju, Korea, Aug. 18-22, 2008, 5 pages.

3rd Generation Partnership Project (3GPP), R1-080165, "Basic Physical Layer Consideration for Enhanced DL in CELL_FACH State for 1.28Mcps TDD", 3GPP TSG-RAN WG1Meeting #51bis, Sevilla, Spain,, Jan. 14-18, 2008, 2 pages.

3rd Generation Partnership Project (3GPP), GP-061329, "Encoding Frequency Parameters for Dual Carrier Assignments", Siemens, 3GPP TSG GERAN#30, Lisbon, Portugal, Jun. 26-30, 2006, 3 pages.

3rd Generation Partnership Project (3GPP), R1-082532, "Control channel support for HSDPA Dual-Cell operation", Philips, NXP, 3GPP TSG RAN WG1 Meeting #53bis, R1-082532, Jun. 30-Jul. 4, 2008, 6 pages.

3rd Generation Partnership Project (3GPP), R1-082249, "Text Proposal for DC-HSDPA Assumptions and Standards Impact", Ericsson, QUALCOMM Europe, 3GPP TSG-RAN WG1 Meeting #53, Kansas City, MO, USA, May 5-9, 2008, 19 pages.

3rd Generation Partnership Project (3GPP), R1-082848, "General Control Channel Design for LTE-A", ZTE, 3GPP TSG-RAN WG1 #54, Jeju, Korea, Aug. 18-22, 2008,3 pages.

3rd Generation Partnership Project (3GPP), R1-082946, "Carrier Aggregation and Control Signaling for LTE-A", LG Electronics, 3GPP TSG RAN WG1 #54, Aug. 18-22, 2008, 5 pages.

3rd Generation Partnership Project (3GPP), R1-082995, "Transport Block Mapping and PDCCH Signaling for Carrier Aggregation", TSG-RAN WG1 Meeting #54, Jeju, Korea, Aug. 18-22, 2008, 1-3.

3rd Generation Partnership Project (3GPP), R1-083193, "Carrier Aggregation Operation in LTE-Advanced", TSG RAN WG1 #54, Qualcomm Europe, Aug. 18-22, 2008, 1-4.

3rd Generation Partnership Project (3GPP), R1-083730, "L1 Control Signaling With Carrier Aggregation in LTE-Advanced", Nokia Siemens Networks, 3GPP TSG-RAN WG1 Meeting #54bis, Prague, Czech Republic, Sep. 29-Oct. 3, 2008, 6 pages.

3rd Generation Partnership Project (3GPP), R1-084474, "Support of Wider Bandwidth for LTE-Advanced", TSG-RAN1 #55, Nov. 10-14, 2008, 10 pages.

3rd Generation Partnership Project (3GPP), R1-090084, "Downlink data and control structure for LTE-A", TSG-RAN WG1 #55bis, Ljubljana, Slovenia, Jan. 12-16, 2009, 4 pages.

3rd Generation Partnership Project (3GPP), R1-090280, "Issues on Carrier Aggregation for Advanced E-UTRA", TSG-RAN WG1 #55bis, Ljubljana, Slovenia, Jan. 12-16, 2009, 1-5.

3rd Generation Partnership Project (3GPP), R1-090284, "RACH Procedure for Asymmetric Carrier Aggregation", Texas Instruments, 3GPP TSG-RAN WG1 #55bis, Jan. 12-16, 2009, 1-3.

3rd Generation Partnership Project (3GPP), R1-090646, "On Component Carrier Types and Support for LTE-A features", NEC Group, 3GPP TSG-RAN WG1 Meeting#56, Feb. 9-13, 2009, 4 pages.

3rd Generation Partnership Project (3GPP), R1-090897, "Initial Access Procedure for Asymmetric Wider Bandwidth in LTE-Advanced," NTT Docomo, 3GPP TSG-RAN WG1 Meeting #56, Feb. 9-13, 2009, 1-5.

(56) References Cited

OTHER PUBLICATIONS

3rd Generation Partnership Project (3GPP), R1-091503, "Anchor Component Carrier and Preferred Control Signal Structure", Fujitsu, 3GPP TSG-RAN1 #56bis, Jan. 23-27, 2009, 1-5.

3rd Generation Partnership Project (3GPP), TS 36.211 V8.5.0, "Technical Specification Group Radio Access Network", Evolved Universal Terrestrial Radio Access(E-UTRA), Physical Channels and Modulation (Release 8), Dec. 2008, 1-82.

3rd Generation Partnership Project (3GPP), TS 36.211 V9.0.0, "Technical Specification Group Radio Access Network, Evolved Universal Terrestrial Radio Access(E-UTRA), Physical Channels and Modulation (Release 9)", Dec. 2009, 1-85.

3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, 1-74.

3rd Generation Partnership Project (3GPP), TS 36.213 V9.0.1, "Technical Specification Group Radio Access Network, Evolved Universal Terrestrial Radio Access (E-UTRA), Physical layer procedures (Release 9)", Dec. 2009, 1-79.

3rd Generation Partnership Project (3GPP), R1-083528, "Issues on Carrier Aggregation for Advanced E-UTRA", Texas Instruments, 3GPP TSG RAN WG1 54bis, Prague, Czech Republic, Sep. 29-Oct. 3, 2008, 6 pages.

3rd Generation Partnership Project (3GPP), R1-083580, "CQI reporting procedure for DC-HSDPA", Huawei, 3GPP TSG-RAN WG1 #54bis, Prague, Czech Republic, Sep. 29-Oct. 3, 2008, 4 pages.

3rd Generation Partnership Project (3GPP), R1-083706, "DL-UL Asymmetric Carrier Aggregation", Huawei, 3GPP TSG-RAN-WG1 Meeting #54bis, Prague, Czech Republic, Sep. 29-Oct. 3, 2008, 4 pages.

3rd Generation Partnership Project (3GPP), R1-083733, "Algorithms and results for autonomous component carrier selection for LTE-Advanced", Nokia Siemens Networks, Nokia, 3GPP TSG RAN WG1 #54bis Meeting, Prague, Czech Republic, Sep. 29-Oct. 3, 2008, 5 pages.

3rd Generation Partnership Project (3GPP), TS 36.213 V8.4.0, "Technical Specification Group Radio Access Network; Evolved Universal Terrestrial Radio Access (E-UTRA); Physical layer procedures (Release 8)", Sep. 2008, 60 pages.

Hyung, et al. "Channel-Dependent Scheduling of Uplink Single Carrier FDMA Systems." Wireless Communications and Networking Conference, 2008. WCNC 2008. IEEE 1860-1864. Mar. 31, 2008.

3rd Generation Partnership Project (3GPP), R1-082468 "Carrier aggregation in LTE-Advanced", 3GPP TSG-RAN WG1 #53bis, Warsaw, Poland, Jun. 30-Jul. 4, 2008. 6 pages.

3rd Generation Partnership Project (3GPP), TS 36.321 V8.3.0, "Technical Specification Group Radio Access Network, Evolved Universal Terrestrial Radio Access (E-UTRA), Medium Access Control (MAC) protocol specification, (Release 8)", Sep. 2008, 47 pages.

3rd Generation Partnership Project (3GPP), TS 36.321 V8.7.0. "Technical Specification Group Radio Access Network, Evolved Universal Terrestrial Radio Access (E-UTRA), Medium Access Control (MAC) protocol specification (Release 8)", Sep. 2009, 47 pages.

3rd Generation Partnership Project (3GPP),TS 36.331, V8.7.0, "3rd Generation Partnership Project; Technical Specification Group Radio Access Network; Evolved Universal Terrestrial Radio Access (E-UTRA) Radio Resource Control (RRC); Protocol specification (Release 8)", Sep. 2009, 208 pages.

3rd Generation Partnership Project (3GPP),TS 36.300, V10.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Jun. 2010, 183 pages.

3rd Generation Partnership Project (3GPP), TS 36.211, V10.0.0, "3rd Generation Partnership Project; Technical Specification Group Radio Access Network; Evolved Universal Terrestrial Radio Access (E-UTRA); Physical channels and modulation (Release 10)", Dec. 2010, 103 pages.

3rd Generation Partnership Project (3GPP),TS 36.212, V10.0.0, "3rd Generation Partnership Project; Technical Specification Group Radio Access Network; Evolved Universal Terrestrial Radio Access (E-UTRA); Multiplexing and channel coding (Release 10)", Dec. 2010, 72 pages.

3rd Generation Partnership Project (3GPP),TS 36.213, V10.0.0, "3rd Generation Partnership Project; Technical Specification Group Radio Access Network; Evolved Universal Terrestrial Radio Access (E-UTRA); Physical layer procedures (Release 10)", Dec. 2010, 98 pages.

3rd Generation Partnership Project (3GPP),TS 36.321, V10.0.0, "3rd Generation Partnership Project; Technical Specification Group Radio Access Network; Evolved Universal Terrestrial Radio Access (E-UTRA); Medium Access Control (MAC) protocol specification (Release 10)", Dec. 2010, 53 pages.

3rd Generation Partnership Project (3GPP),TS 36.331, V10.0.0, "3rd Generation Partnership Project; Technical Specification Group Radio Access Network; Evolved Universal Terrestrial Radio Access (E-UTRA); Radio Resource Control (RRC); protocol specification (Release 10)", Dec. 2010, 276 pages.

* cited by examiner

CONTROL CHANNEL SIGNALING AND ACQUISITION FOR CARRIER AGGREGATION

CROSS REFERENCE TO RELATED APPLICATIONS

This application is a continuation of U.S. patent application Ser. No. 12/582,459 filed Oct. 20, 2009, now U.S. Pat. No. 8,705,461 issued Apr. 22, 2014, which claims the benefit of U.S. Provisional Patent Application Nos. 61/106,810 filed Oct. 20, 2008; 61/111,573 filed Nov. 5, 2008; 61/142,429 filed Jan. 5, 2009; and 61/157,758 filed Mar. 5, 2009, which are incorporated by reference as if fully set forth.

FIELD OF INVENTION

This application is related to wireless communications.

BACKGROUND

Long Term Evolution (LTE) supports data rates up to 100 Mbps in the downlink and 50 Mbps in the uplink. LTE-Advanced (LTE-A) provides a fivefold improvement in downlink data rates relative to LTE using, among other techniques, carrier aggregation. Carrier aggregation may support, for example, flexible bandwidth assignments up to 100 MHz. Carriers are known as component carriers in LTE-A.

LTE-A may operate in symmetric and asymmetric configurations with respect to component carrier size and the number of component carriers. This is supported through the use or aggregation of up to five 20 MHz component carriers. For example, a single contiguous downlink (DL) 40 MHz LTE-A aggregation of multiple component carriers may be paired with a single 15 MHz uplink (UL) carrier. Non-contiguous LTE-A DL aggregate carrier assignments may therefore not correspond with the UL aggregate carrier assignment.

Aggregate carrier bandwidth may be contiguous where multiple adjacent component carriers may occupy continuous 10, 40 or 60 MHz. Aggregate carrier bandwidth may also be non-contiguous where one aggregate carrier may be built from more than one, but not necessarily adjacent component carriers. For example, a first DL component carrier of 15 MHz may be aggregated with a second non-adjacent DL component carrier of 10 MHz, yielding an overall 25 MHz aggregate bandwidth for LTE-A. Moreover, component carriers may be situated at varying pairing distances. For example, the 15 and 10 MHz component carriers may be separated by 30 MHz, or in another setting, by only 20 MHz. As such, the number, size and continuity of component carriers may be different in the UL and DL.

In order to access LTE-A for DL and UL transmissions, a wireless transmit/receive unit (WTRU) may need to know DL and UL carrier configurations in terms of bandwidth, DL and UL component carrier pairings, random access parameters, and other LTE-A system specific information. Carrier aggregation information, such as the identity of the carrier, may also need to be conveyed from a base station to the WTRU. Control information with respect to carrier aggregation implementation may be carried over a physical downlink control channel (PDCCH). The requirements for the PDCCH may need to be defined and the WTRU may need to know the time and frequency location of the PDCCH to obtain the control information.

SUMMARY

A method and apparatus for control channel signaling and acquisition in wireless communications that supports carrier aggregation. The method includes determining to which component carrier to listen to, detecting the downlink control channel, processing mapping information related to downlink and uplink transmissions and operating discontinuous reception with respect to carrier aggregation. The method also includes detecting a component carrier, determining the component carrier type and locating the anchor component carrier, if necessary, where the anchor component carrier carries the carrier aggregation information.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
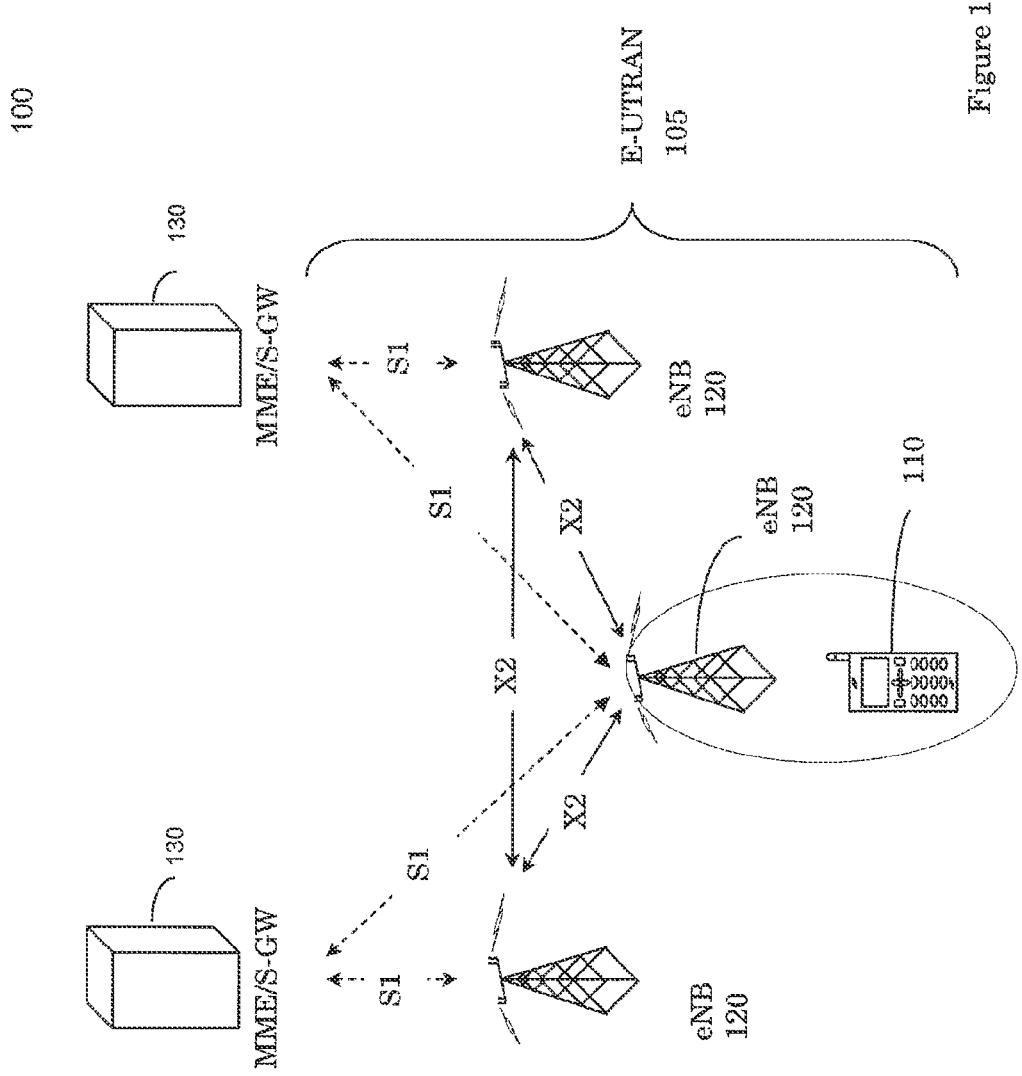
FIG. 1 is an embodiment of a wireless communication system/access network of long term evolution (LTE)

FIG. 1 shows a Long Term Evolution (LTE) wireless communication system/access network 100 that includes an Evolved-Universal Terrestrial Radio Access Network (E-UTRAN) 105. The E-UTRAN 105 includes a WTRU 110 and several evolved Node-Bs, (eNBs) 120. The WTRU 110 is in communication with an eNB 120. The eNBs 120 interface with each other using an X2 interface. Each of the eNBs 120 interface with a Mobility Management Entity (MME)/Serving GateWay (S-GW) 130 through an S1 interface. Although a single WTRU 110 and three eNBs 120 are shown in FIG. 1, it should be apparent that any combination of wireless and wired devices may be included in the wireless communication system access network 200.

Figure 2:
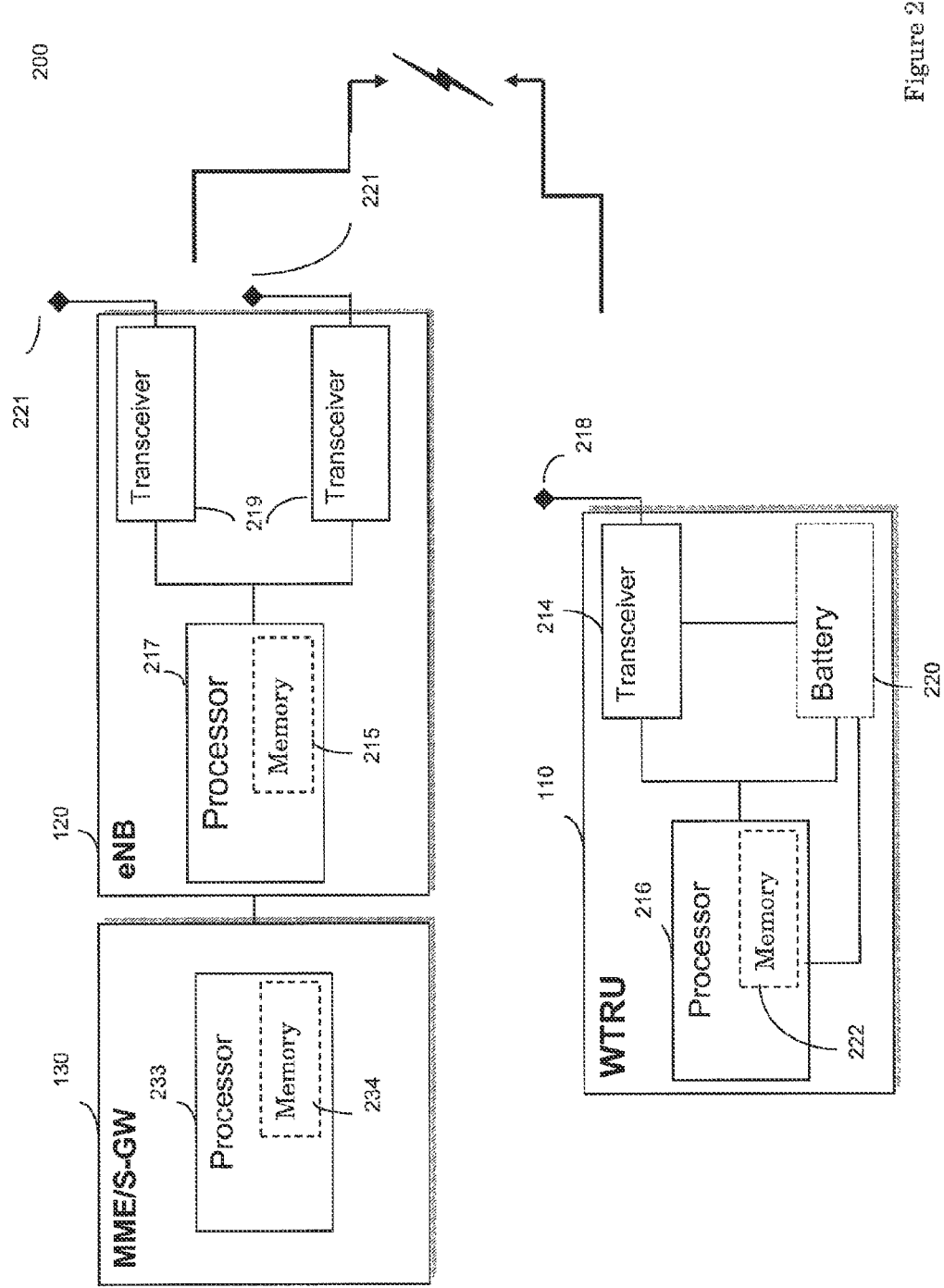
FIG. 2 are example block diagrams of a wireless transmit/receive unit and a base station of the LTE wireless communication system.

FIG. 2 is an example block diagram of an LTE wireless communication system 200 including the WTRU 110, the eNB 120, and the MME/S-GW 130. As shown in FIG. 2, the WTRU 110, the eNB 120 and the MME/S-GW 130 are configured to perform control channel signaling and acquisition for a carrier aggregation implementation.

In addition to the components that may be found in a typical WTRU, the WTRU 110 includes a processor 216 with an optional linked memory 222, at least one transceiver 214, an optional battery 220, and an antenna 218. The processor 216 is configured to perform control channel signaling and acquisition for a carrier aggregation implementation. The transceiver 214 is in communication with the processor 216 and the antenna 218 to facilitate the transmission and reception of wireless communications. In case a battery 220 is used in the WTRU 110, it powers the transceiver 214 and the processor 216.

In addition to the components that may be found in a typical eNB, the eNB 120 includes a processor 217 with an optional linked memory 215, transceivers 219, and antennas 221. The processor 217 is configured to perform control channel signaling and acquisition for a carrier aggregation implementation. The transceivers 219 are in communication with the processor 217 and antennas 221 to facilitate the transmission and reception of wireless communications. The eNB 120 is connected to the Mobility Management Entity/Serving GateWay (MME/S-GW) 130 which includes a processor 233 with an optional linked memory 234.

LTE-Advanced (LTE-A) uses carrier aggregation, where a LTE-A cell is composed of multiple LTE carriers, each up to 20 MHz and possibly contiguous. Carrier aggregation information may need to be conveyed from a base station to a wireless transmit/receive unit (WTRU) for downlink and uplink transmissions.

Disclosed herein are example methods for indicating that carrier aggregation may be in use and applicable. It is noted that LTE-A may need to be backward compatible with LTE Release 8 and 9 and therefore one, several, or all component carriers may support earlier LTE-based operation. A compatible component carrier may carry a synchronization channel (SCH), a broadcast channel (BCH), and other LTE channels. It is further noted that LTE WTRUs operating in a carrier aggregation environment may have no knowledge that it is in a LTE-A carrier aggregation cell. A network mechanism is used to prevent excessive handover (HO) and cell load balancing.

One example method for conveying carrier aggregation applicability uses a broadcast channel. Compatibility with LTE means that one, several or all component carriers may carry a LTE-A BCH to inform an LTE-A compliant WTRU about carrier aggregation. The LTE-A BCH is an extension of the LTE BCH that does not interfere with and is compatible with LTE operation. The LTE-A BCH carries LTE-A related cell-specific control information as disclosed herein. The LTE-A related cell-specific control information may be carried as a new master information block (MIB) in a LTE-A primary BCH (P-BCH) that is either in a LTE-compatible carrier or an LTE-A only component carrier. The LTE-A related cell-specific control information may also be carried as a new system information block (SIB) in a LTE-A dynamic BCH (D-BCH) that is either in a LTE-compatible carrier or an LTE-A only component carrier.

As disclosed hereinafter with respect to example embodiments, a component carrier that is compatible with LTE Release 8 WTRUs may also be an anchor carrier, where an anchor carrier carries the LTE-A specific control information. A new MIB and new SIB may be defined for this anchor component carrier for LTE-A WTRUs. There may also be other component carriers which are not compatible with Release 8 WTRUs. The current structure for LTE WTRUs may be preserved in this anchor component carrier. For example, the synchronization channel and broadcast channel that carry the MIB and SIBs may be the same as in Release 8. The new MIB and/or SIBs that may be transmitted in this anchor component carrier for LTE-A WTRUs may be readable only by LTE-A WTRUs. The new MIB and SIBs may be time and/or frequency multiplexed with the LTE Release 8 MIB and SIBs. Moreover, a new radio network temporary identifier (RNTI) may be used by the LTE-A WTRUs for the new MIB and SIBs. The MIBs and SIBs that are readable by the LTE-A WTRUs may exist on all anchor component carriers. The new MIB and SIBs may be based on the LTE-A WTRU class.

As disclosed hereinafter with respect to example embodiments, a component carrier that is compatible with LTE Release-8 WTRUs may also be an anchor carrier having additional SIBs that are defined on this anchor component carrier for LTE-A WTRUs. There may also be other component carriers which are not compatible with Release-8 WTRUs. New MIB and/or SIBs may be defined in the other component carriers for LTE-A WTRUs.

In another example method, non-message based methods may be used to indicate carrier aggregation. The information about downlink component carriers may be implicitly carried in the synchronization channel. For example, the synchronization sequences that are used by a base station, such as an eNodeB, on component carriers are selected/arranged such that when the WTRU detects them, these component carriers are known to be aggregated.

In another example method, existing spares codepoints may be used in the existing MIB to indicate 40, 60, 80, etc. MHz aggregation.

In another example method, the extension bit on spares in existing MIBs may refer to some other location that may have more detailed information about all the possible bandwidth configurations. For example, SIB1 or extension thereof may be used.

In another example method, LTE-A control and/or system information may be transmitted with Radio Resource Control (RRC) signaling. In this example, no new MIB or SIBs are defined for LTE-A WTRUs. After a WTRU gets connected to the system, the required information may be signaled with higher layer signaling. To reduce delay, this information can also be transmitted during the Random Access Channel (RACH) process, for example, using message 4.

In another example method, the component carriers are not compatible with Release 8 WTRUs and are not discoverable by Release 8 WTRUs. New synchronization channel, MIBs and SIBs may be defined on these component carriers. These new channels and information are readable by LTE-A WTRUs. Auxiliary carriers may also be defined that are not discoverable by any WTRU. These may be discovered via signaling on other carriers and used as needed to increase the transmission bandwidth. Same cell ID or some other implicit function may be used for the component carriers that are to be aggregated. For example, when the WTRU detects the same cell ID on several component carriers, it then means these carriers are aggregated. A pre-sorted list may exist for component carriers that are being aggregated. This list may be transmitted to the WTRU via signaling disclosed herein.

In another example method disclosed hereinafter with respect to example embodiments and the uplink, the WTRU detects all or some of the component carriers. The WTRU starts the random access procedure for all of the component carriers it wants to be aggregated. For example, if there are 5 component carriers and the WTRU wants to use only the 1st and 2nd, then random access is attempted for these two component carriers. For uplink carrier aggregation, RRC signaling or random access messages, for example message 4, may be used.

In another example method, each component carrier is read individually and then tied together through comparing and matching up BCH information. For example, a flag may be used on the BCH to indicate that this component carrier is a part of an aggregation. In this case, redundant MIB information that may transmitted on MIB on each individual component carrier, such as most significant (MSB) of sequence frame number (SFN), may need to be consolidated.

In another example method, a component carrier may be LTE Release 8 WTRU compatible and part of an aggregate. However, it does not carry an LTE-A P-BCH. The component carrier may be part of a slave/master scheme where the component carry may broadcast an offset, such as for example, a pairing distance to a master component carrier. The offset may be used as a flag that points at a component carrier that provides the LTE-A BCH (e.g., the master).

For each of the examples discussed herein and as disclosed with respect to the example embodiments, if an LTE-A WTRU camps on a component carrier that does not carry the LTE-A system information, the WTRU may be redirected to a component carrier that carries the LTE-A system information.

As such, the LTE-A WTRU may receive information regarding which component carrier(s) to listen to for downlink control information from the LTE-A BCH, or L1 or L2/3 signaling.

Disclosed hereinafter are example methods for detecting the downlink control information. The WTRU then may detect its downlink control channel among all candidates by using blind detection, where candidates are all possible control channels among which one or more target the specific WTRU. As stated herein, a downlink control channel may be a physical downlink control channel (PDCCH) that may be used to send LTE-A control information. When multiple PDCCHs are used for component carriers, for example when there is one PDCCH per component carrier, the number of blind detections increases remarkably with the number of PDCCHs. The number of blind detections can be reduced by limiting the WTRU-specific search space. This search space is signaled to the WTRU by higher layer signaling. To reduce the number of blind detections and higher layer signaling overhead, the same search space may be used in all component carriers, such as for example, the search space used in the primary carrier.

Disclosed hereinafter are examples of what the control information may indicate. In an example, the LTE-A control information may indicate the location of downlink data grants for LTE-A WTRUs. In an example embodiment, the location of the downlink data grants may be in the same component carrier in which the control information was received. In another example embodiment, the location of the downlink data grants may be in a different component carrier than that in which the control information was received. In another example embodiment, if multiple component carriers are used to carry the location of the downlink data grants, the location of the downlink data grants may or may not be included in the same component carrier in which the control information was received.

The downlink data grants may indicate a pre-grant. For example, in a transmission time interval (TTI) before the actual grant, the WTRU may receive the pre-grant which tells the WTRU that an actual grant will be transmitted in the next TTI. The pre-grant may also indicate on which component carrier(s) the data may be sent. In this way, the LTE-A WTRU can reduce the memory needed to buffer downlink data that is for other WTRUs.

The WTRU may be configured to handle downlink data grants that may arrive one or more symbols prior to arrival of the data. The LTE-A sub-frame may have control symbols positioned earlier than in LTE to permit lower complexity WTRU operation.

Disclosed hereinafter are examples with respect to the physical downlink control channel (PDCCH) and how it may be mapped to component carriers depending on at least the size of the total aggregated bandwidth, the number of component carriers and other factors disclosed herein.

In an embodiment, the WTRU is configured to handle the scenario when the sizes of the component carriers are different and the sum is less than or equal to the maximum LTE bandwidth of 20 MHz (e.g., two carriers of 10 MHz and 5 MHz; or two carriers of 10 MHz each). One PDCCH for multiple component carriers may be used. For example, one PDCCH for (10+10) MHz may use the same control channel formats as in LTE.

In another embodiment, one control channel, e.g., the PDCCH, may be used for a group of multiple downlink component carriers, including as many as all the available component carriers. The PDCCH may be transmitted in one of the multiple downlink component carriers. The WTRU is configured to detect the PDCCH without having to search in all of the other component carriers of the group. As necessary, the PDCCH may be shifted to another component carrier, the location of which is communicated to the WTRU by L1 or L2/L3 signaling or based on implicit mapping derived from the sequence frame number (SFN), TTI index, WTRU ID, etc.

In some cases, the same frequency resources may be used in all or some of the component carriers. For example, for WTRUs with peak data rate requirements, it may be possible that all or most of the resources on all component carriers will be used for both downlink or uplink transmissions, or that wideband CQI is reported by the WTRU. The same resources on multiple component carriers may also be used for frequency diversity, by coding and distributing the transmission over multiple component carriers (and within component carriers), repeating the same data on those resources in different component carriers, using different redundancy versions in different component carriers, or when hopping over the component carriers.

When using a PDCCH per component carrier approach, it is unnecessary to send separate PDCCHs for all component carriers. If the same HARQ process is used for the component carriers, it may be indicated by L1 or L2/L3 signaling that the one PDCCH is used for all or some subset of the component carriers. If separate HARQ processes are used for the component carriers, smaller PDCCH formats may be used for the other component carriers. These formats do not need to carry common information, such as resource allocation, MIMO information, etc.

When one PDCCH is used for multiple component carriers (including all), it may be indicated by L1 or L2/L3 signaling. The PDCCH format includes common information, e.g., resource allocation, MIMO, etc., that is applied to all component carriers.

In the case that component carriers are different sizes, the same allocation may be possible for all operating component carriers. Therefore, a rule is needed for the WTRU and the base station on how to interpret the allocation in other component carriers. For example, if the PDCCH in component carrier A indicates that resource blocks (RBs) 50-100 are used, but in the attached component carrier, component carrier B, where the allocation is to be copied, there are only 75 RBs, the allocation for component carrier B has to be determine. In this case, the rules may determine that component carrier B should use RBs 50-75, or use RBs 25-75.

The mapping between the PDCCH and the component carriers used to transmit a shared data channel, for example a physical downlink shared channel (PDSCH), may be done by higher layer signaling, L1 signaling (the PDCCH then also carries the indices of the carriers), and/or implicitly by the component carrier that transmits the PDCCH. When L1 signaling is used to indicate for which carrier the resource allocation information in the downlink grant is for, the PDCCH field that carries the index/indices of the carrier(s) may be referred as the carrier indicator field. After decoding the PDCCH, the WTRU would use the indicated carrier(s) to receive downlink transmission.

In a LTE downlink sub-frame, the first orthogonal frequency division multiplexing (OFDM) symbol may contain a physical control format indicator channel (PCFICH) and the first one to K orthogonal frequency division multiplexing (OFDM) symbols may be used to transmit control data (e.g., K may be up to the first four OFDM symbols, but is not limited to this number), and the remaining OFDM symbols may be used for data transmission. The number of OFDM symbols used to transmit control data is signaled in the PCFICH. A PCFICH may signal zero to K OFDM symbols which are used to carry control data. In embodiments which include a PDCCH in a component carrier, the PDCCH may be carried in the same or a different component carrier than the one for which the PDSCH is scheduled. When the PDCCH is transmitted in another component carrier, the WTRU still needs to know how many OFDM symbols are used for control data in the target component carrier (which has the PDSCH) for correct decoding. Therefore, the following restrictions apply. The PCFICH is always transmitted in all component carriers regardless of the location of the PDCCHs. Therefore, there may be an independent control region size per component carrier.

When the WTRU detects a PCFICH in a component carrier, the number of OFDM symbols, as indicated by the PCFICH, used for control data transmission in the target component carrier is decoded. This includes the possibility for zero OFDM symbols for control data transmission.

In another embodiment, the PCFICH for all or several component carriers may be transmitted in one of the component carriers, for example a primary component carrier. In this way, the WTRU may be indicate the number of PDCCH symbols in each component carrier, and it may also determine the number of data symbols in each component carrier as well.

The eNodeB transmits a PCFICH in one or more component carriers to indicate how many PDCCH symbols are present in one or more component carriers. The eNodeB will indicate a zero length PDCCH region by specifying a zero length PDCCH region, hereafter called a PDCCH-less component carrier, in the corresponding PCFICH. A component carrier which has a zero length PDCCH region must be associated with a component carrier that has a PDCCH present by the eNodeB. The eNodeB will indicate a PDCCH-less component carrier to increase the available resource blocks for PDSCH data transmission to a WTRU.

Disclosed herein are methods for signaling carrier component configuration. In general, the number of uplink and downlink component carriers, respectively, is limited. Alternatively, the allowed combinations (in terms of the aggregated number and/or uplink/downlink pairing) are limited and the configuration is signaled via BCH (in cell specific asymmetric aggregation case) or L2/3 signaling (in WTRU specific asymmetric aggregation case).

When the number of downlink component carriers is different than that of uplink component carriers, (that is, asymmetric uplink/downlink component carrier aggregation for the PDCCH signaling), any of the disclosed methods herein may be used for PDCCH signaling. For the asymmetric uplink/downlink case, the size of each component carrier and the number component carriers may not be the same in the downlink or the uplink. In addition, the number of uplink and downlink component carriers may not be the same. For a given WTRU in this case, the number of active component carriers may be less than the total in either the uplink or downlink. In the "self contained" approach disclosed herein, it may be natural to have a single uplink component carrier associated with each downlink component carrier and some uplink component carriers may be associated with more than one downlink component carrier. WTRU-specific uplink/downlink pairing may also be used for load balancing (e.g., consider 3 downlink and 2 uplink component carriers). Cell specific uplink/downlink pairing may result in more loads on a given uplink component carrier than WTRU-specific uplink/downlink pairing (e.g. consider the case of 3 uplink component carriers where one uplink component carrier is used by all the WTRUs).

Disclosed hereinafter are example methods for uplink configuration with respect to carrier configuration. In LTE-A, the eNodeB will determine the uplink resource assignment based on received WTRU feedback, network load and other information. The uplink scheduling grant will be signaled to the WTRU via downlink control information (DCI) on the PDCCH. The terms DCI and PDCCH may be used interchangeably. As disclosed herein, carrier aggregation is important in LTE-A in order to support downlink transmission bandwidths larger than 20 MHz, e.g. 100 MHz. The mapping of uplink (UL) scheduling grants (which is also carried on the PDCCH) is also important because carrier aggregation is used in UL, and the possibility of UL/DL asymmetric carrier aggregation will make mapping difficult. The asymmetry applies to both carrier size and number of carriers, i.e., a 20 MHz DL carrier may be paired with two 5 MHz UL carriers.

The UL scheduling grant signaling carried in the PDCCH plays a critical role in carrier aggregation. UL scheduling grant signaling may depend on the aggregation levels for medium access control layer (MAC) and on the aggregation levels for the physical layer (PHY). In addition, backward compatibility with respect to LTE Release 8 needs to be considered.

In an embodiment, a method for mapping the uplink grant for each UL carrier to a single DL carrier regardless of the UL/DL asymmetry is disclosed. Mapping the uplink grant may be fixed for all possible UL/DL aggregation scenarios. Mapping may be fixed or semi-static. The mapping may be done by WTRU specific signaling or by cell specific higher layer signaling. When there are multiple DL component carriers, the UL grant is hopped over different DL carriers in different TTIs. The hopping pattern may be signaled to the WTRU by cell specific signaling or by WTRU specific higher layer signaling. Alternatively, the hopping may also be determined by a predefined rule, such as circular shift using modulo operation.

If the UL Grant mapping is indicated to the WTRU using either specific signaling, or higher layer signaling, and the WTRU reads this signaling using a semi-static procedure, the WTRU decodes the UL grant in the indicated component carrier when received.

If determined by a predefined rule, the WTRU uses a modulus operation to determine the hopping pattern for the UL grant. Once determined, the WTRU decodes the UL grant in the indicated component carrier.

The UL grant for each UL component carrier or for each UL hybrid automatic repeat request (HARQ) entity may be independently encoded and mapped to a corresponding DL component carrier(s). In the case where spatial multiplexing is used in the uplink, several codewords that are spatially multiplexed on the same time-frequency resources may be controlled by one HARQ entity. Alternatively, the UL grants for multiple UL component carriers (or UL HARQ entities) may be jointly encoded and mapped to a single DL component carrier. Alternatively, the jointly encoded UL grants may be spread over multiple DL component carriers.

In another embodiment, a method for mapping the uplink grant for all UL component carriers on to one DL component carrier for the asymmetric case is disclosed. The UL grant needs to carry control information for a set of UL component carriers. For a fixed mapping between the uplink scheduling grant and corresponding uplink component carriers, the mapping is signaled either by WTRU specific signaling or by cell specific higher layer signaling. When WTRU-specific signaling is used, a mapping between WTRU-specific parameter(s) and UL component carrier index is necessary. A mapping using WTRU ID or the like to UL component carriers may also be used. When there is one uplink component carrier per uplink grant for a WTRU, then the uplink grant does not need to contain the index of the uplink component carrier. When one uplink grant assigns resources on several component carriers, the resource allocation field in the uplink grant may include uplink component carrier indices or extended RB indices span over several component carriers. When a dynamic mapping between uplink scheduling grant and corresponding uplink component carriers is used, the uplink component carrier index information may be signaled in the uplink scheduling grant. A bitmap mapping to UL component carriers associated with the UL grant may also be used. Other mapping methods may also be utilized.

Multiple UL scheduling grant components are combined into an aggregated UL grant, each component grant corresponding to a separate UL component carrier. However, common information (including UE ID) may be shared among UL grant components in the aggregated UL grant (signaled only once) to save signaling overhead.

One uplink grant exists for all or some of the component carriers. When clustered discrete Fourier transform spread orthogonal frequency division multiple a access (DFT-S-OFDMA), N×single-carrier frequency-division multiple access (SC-FDMA), or a hybrid of clustered DFT-S-OFDMA and N×SC-FDMA is used as the multiple access scheme, one uplink grant could allocate resources on several component carriers. As an example, component carriers that are combined with a single discrete Fourier transforms-inverse fast Fourier transform (DFT-IFFT) pair (e.g., contiguous carriers) in the SC-FDMA air interface may be addressed with a single grant.

Downlink control information (DCI) formats for granting UL resources are extended to treat the aggregate UL bandwidth (BW) in the component carriers to be used as a single component carrier of the combined size (e.g., if two 5 MHz component carriers are associated with an UL grant, the DCI format corresponds to a 10 MHz component carrier, where the DCI format has the size it would have if there was a single 10 MHz UL component carrier). The ordering of component carriers and the resource blocks (RBs) across the aggregation may be inferred from their carrier frequency signaled in BCH, in the WTRU or from cell specific signaling. For aggregated BW greater than 20 MHz, the extension of the DCI format corresponds to the aggregated BW. For example, if the aggregation is 20+10 MHz, the DCI format would correspond to that of a single band with 30 MHz.

DCI formats for granting UL resources include a set of common fields and a set of component carrier-specific (or component carrier group specific) fields. It may require a second cyclic redundancy check (CRC) for group-specific common control channel. All or some of the following parameters may be common for all component carriers: modulation and coding set (MCS), precoder(s), number of layers, number of codewords, frequency hopping, distributed virtual resource block (DVRB). RB allocation per component carrier may be different. Alternatively, all parameters are common (e.g., resource allocations are imaged or mirrored in all or some of the component carriers).

The downlink component carrier which all uplink component carriers are mapped on to may be configured by higher layer signaling.

In another embodiment, a method for mapping the uplink grant on to a (possibly different) pre-determined component carrier is disclosed. The mapping between UL and DL component carriers is both specified and fixed in the standards (no extra signaling is needed), signaled by WTRU specific signaling or by cell specific higher layer signaling.

If more than one uplink component carrier is mapped to a downlink component carrier, the UL grant needs to carry control information of the UL component carrier indices. The methods disclosed herein for mapping the uplink grant for each UL component carrier to a single DL component carrier regardless of UL/DL asymmetry may be used for this embodiment as well.

In the situation where there are physical downlink channels (PDCCHs) in all or some of the downlink component carriers, the WTRU may check these carriers to see if PDCCH exists with different frequencies. A primary downlink component carrier is that carrier which the WTRU may initially camp on. The WTRU may only read the primary downlink component carrier, and may read the other component carriers when commanded using either carrier indication or higher layer signaling. For example, when an eNodeB requests the WTRU to transmit data on an uplink component carrier mapped to a downlink component carrier which is not the primary component carrier, the uplink grant will be carried on that downlink component carrier. Two embodiments are disclosed to address this situation. In an embodiment, where there is a default uplink component carrier and an associated downlink component carrier, the WTRU always monitors the downlink component carrier, which could be the primary component carrier or a different one. In another embodiment, the DRX procedures designed for downlink component carrier disclosed herein apply to this situation as well, i.e., uplink grant is also carried by a PDCCH, and the same DRX procedures apply.

Multiple UL grants that are used for one WTRU are simultaneously transmitted in a single (or multiple) DL component carriers with multiple PDCCHs. The WTRU has multiple WTRU IDs to distinguish which UL grant maps to which UL component carrier. The mapping between WTRU IDs and component carrier is determined by the network and signaled by higher layers. Some WTRU IDs may correspond to multiple UL component carriers and the granting methods disclosed herein are used to interpret the grant.

Disclosed hereinafter are example methods for discontinuous reception (DRX) operation in LTE-A with carrier aggregation.

In an embodiment, the WTRU is configured to be active in one or more but not all component carriers (i.e., the WTRU has either uplink or downlink transmissions). The other component carriers are idle and the WTRU does not try to detect any control information on those DL component carriers. A separate PDCCH may be sent for each component carrier. If the WTRU is scheduled on the other component carriers, it is informed by L1 or L2/L3 signaling on the current component carrier on which it is active. After reception of the signaling, the WTRU attempts to detect the PDCCH on the other component carriers. The time between the reception of the signaling (when it is scheduled on other carriers) and the transmission of the PDCCH on the other carriers may be pre-determined. With such a mechanism, DRX is used only on one of the active component carriers, for example the primary component carrier.

In a self contained scenario where there each component carrier has a PDCCH, and there is a PDSCH per carrier per PDCCH, a DRX may be used per component carrier to more flexibly reduce the WTRU power consumption by reducing the ON duration of component carriers that are not used as often compared to the ON duration of the most used component carriers. Current DRX procedures do not permit a zero ON duration since it would not make any sense in a single carrier system. With a multi component carrier system, the ON duration is allowed to go to zero on all but one component carrier to more fully take advantage of DRX power reductions. Accordingly, the DRX parameter range may include a zero ON duration or infinite DRX sleep time. DRX procedures that are set up for one component carrier may be set up via communication on the other component carriers so that the WTRU can be informed to start listening again to a component carrier that previously had a zero ON duration. For example, an radio resource control (RRC) signaling may be carried on component carrier A to set up the DRX procedure on component carrier B.

The DRX behavior on some component carriers may be affected by the reception of a PDCCH in another component carrier. During the ON duration of a DRX cycle in carrier A, the WTRU may get a PDCCH while the base station is ready to start a high data transmission with multiple component carriers, but the DRX cycle on the other component carriers is long or has a zero ON duration. The reception of a PDCCH on component carrier A causes the WTRU to change DRX behavior on other component carriers. For example, the WTRU monitors the next N sub-frames in certain other (or all) component carriers). As another example, the WTRU falls back to a different DRX cycle with higher ON duration probability for a predetermined time. The WTRU may also monitor a predefined pattern of component carriers for the PDCCH for a predefined time.

Alternatively, a 2-D DRX pattern may be defined over the entire aggregation or a subset of it. Rather than a per-carrier DRX procedures, a single multi-carrier DRX pattern may be defined by a duration and location of ON durations in all component carriers that the WTRU is to monitor.

To maintain backward compatibility with LTE Release 8, all component carriers are configured such that they can support Release 8 compatible WTRUs. Each component carrier may be configured as disclosed herein. In an embodiment, in each carrier, Release 8 PDCCH and LTE-A PDCCH are multiplexed in a code divison multiplexing (CDM) manner. In this case, the spreading (or masking) code may be derived based on WTRU ID that is the radio network temporary identifier (RNTI).

Disclosed herein are example methods for addressing compatibility between LTE Releases and LTE-A. In an embodiment, in each carrier, Release 8 PDCCH and LTE-A PDCCH are multiplexed in a frequency division multiplexing (FDM) manner. Alternatively, an LTE-A network may reserve certain resource allocation portions of the bandwidth for LTE-A WTRUs.

In another embodiment, in each carrier, Release 8 PDCCH and LTE-A PDCCH are multiplexed in a time division multiplexing (TDM) manner such that LTE-A PDCCH is transmitted in different OFDM symbols.

In another embodiment, in each carrier, Release 8 PDCCH and LTE-A PDCCH are multiplexed in a TDM manner such that LTE-A PDCCH is transmitted in TTIs—e.g., some sub-frames are LTE and some are LTE-A. DRX may be used to manage separation between the two types so that LTE WTRUs don't try to decode LTE-A PDCCHs.

In another embodiment, in each carrier, multiplexing Release 8 PDCCH and LTE-A PDCCH in a hybrid FDM/TDM manner such that LTE-A PDCCH is transmitted in different resource elements (REs).

Figure 3:
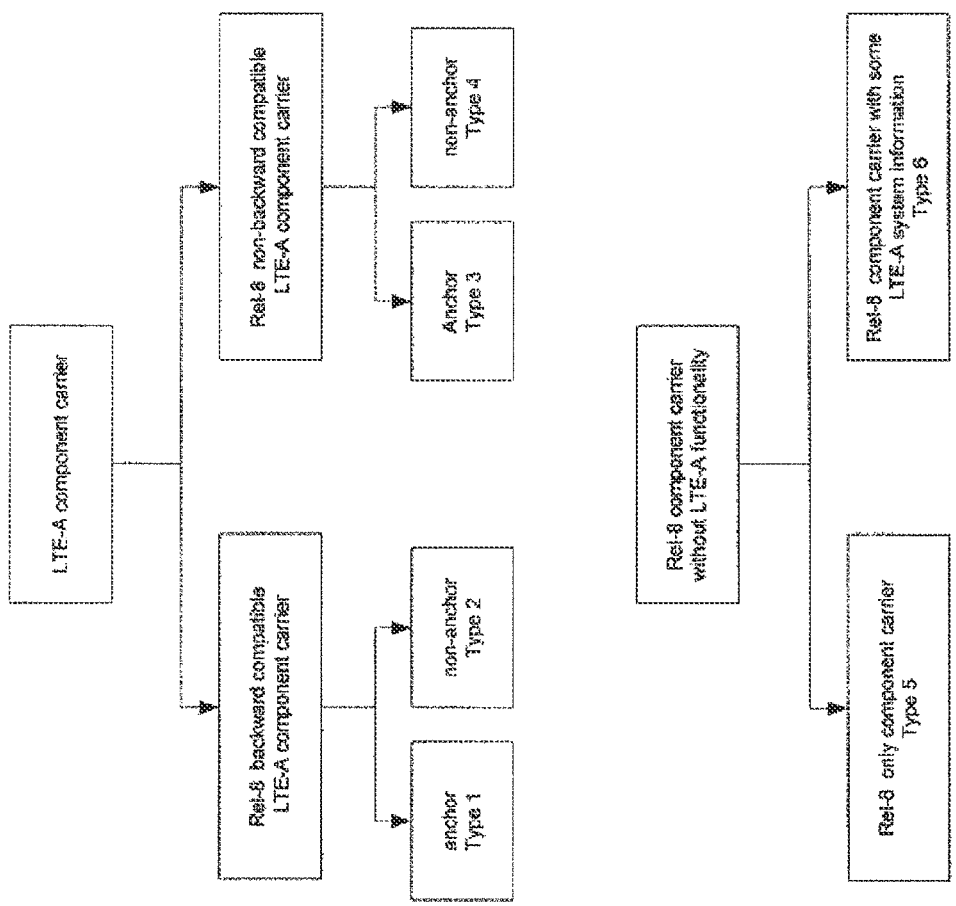
FIG. 3 are examples of different component carriers.

Disclosed hereinafter are example embodiments with respect to signaling and acquisition. FIG. 3 illustrates the different types of component carriers that may be applicable in the example embodiments and are disclosed herein for illustrative purposes.

In general, in a first example embodiment there is only one LTE-A component carrier which carries the LTE-specific system information and this component carrier is called either the primary or anchor component carrier. The terms primary or anchor component carrier may be used interchangeably to mean the same thing. By configuration, the designated anchor carrier may provide system information, synchronization and paging for a certain cell. A non-anchor carrier may not have the LTE-A specific broadcast channel but may have the synchronization channel. The remaining LTE-A component carriers, (the non-anchor carriers), may not carry the LTE-A system information. The non-anchor component carriers may not have synchronization channels so they are not detectable by the WTRU, except in two situations. In a first exception, if a non-anchor LTE-A component carrier supports Release 8 WTRUs, the non-anchor LTE-A component carrier has the Release 8 synchronization channel and the Release 8 broadcast channel. This is shown as Type 2 in FIG. 3. In a second exception, if a non-anchor Release 8 carrier does not support LTE-A functionalities but has some LTE-A specific system information, it has the Release 8 synchronization channel and the Release 8 broadcast channel. This is shown as Type 6 in FIG. 3.

A second example embodiment may have several anchor carriers in an LTE-A system. In addition to the anchor component carrier, there may be Release 8 carriers. The Release 8 carrier may be "Release 8 component carriers without LTE-A functionality", shown as Types 5 and 6 in FIG. 3 or backward compatible LTE-A component carriers that support Release 8 functionality, shown as Types 1 and 2 in FIG. 3. Type 5 and Type 6 component carriers do not support LTE-A functionality such as more advanced multiple-input multiple-output (MIMO) techniques, cooperative communications, LTE-A specific control channels, etc. Type 6 component carriers may have some additional information transmitted, for example in the broadcast channel, and this information is transparent to Release 8 WTRUs. It should be understood that, Release 8 backward compatible LTE-A component carriers support both Release 8 and LTE-A functionalities.

Moreover, there may also be Release 8 non-backward compatible LTE-A component carriers, shown as Types 3 and 4 in FIG. 3 and auxiliary carriers. Type 3 and 4 component carriers are not backward compatible and are not used by Release 8 WTRUs. Auxiliary carriers are discoverable neither by Release 8 nor LTE-A WTRUs and may be configured by the base station for usage as additional bandwidth. The non-anchor, Release 8 non-backward compatible LTE-A component carriers, shown as Type 4 in FIG. 3, are not detectable by the WTRUs.

Both Release 8 and LTE-A carriers use the same synchronization channel and techniques. This means that the WTRU may not differentiate these two types of carriers by using the synchronization channel. The anchor component carrier may be either Release 8 backward compatible or non-backward compatible.

In general, after the WTRU detects one of these carriers during the synchronization phase, it needs to get the LTE-A specific system information. This information is transmitted on the broadcast channel of the anchor carrier(s) only. Therefore, the WTRU needs to detect the anchor carrier and read the system information on this carrier. Disclosed hereinafter are anchor carriers that address the mechanisms and procedures via which the WTRU locks on to the anchor carrier; determines whether or not a carrier is the anchor; receives the transmitted LTE-A specific system information and determines the type of information carried by the anchor carriers.

An example embodiment of an LTE-A signaling and acquisition with a single anchor component carrier will now be disclosed. The example embodiment has a single anchor carrier in the LTE-A system and only this carrier may carry the LTE-A specific system information.

The example embodiment has two phases. A first phase relates to the WTRU locking on to the anchor carrier. The second phase relates to transmission of LTE-A specific system information. Both aspects are detailed below.

During the first phase or synchronization phase, the LTE-A WTRU locks onto any of the carriers because the WTRU sweeps a frequency band until it successfully finds a synchronization channel. The LTE-A WTRU may lock onto one or more of the following carriers: component carriers with Release 8 compatibility, such as type 1, 2, 5, or 6, and anchor LTE-A component carriers such as Release 8 backward compatible Type 1 and Release 8 non-backward compatible Type 3.

The first phase may have two aspects. The first aspect is concerned with determining the type of carrier once the WTRU finds the component carrier. The WTRU determines whether or not the carrier is the anchor carrier. The second aspect comes into play if the WTRU learns that the component carrier is not the anchor carrier. The second aspect provides methods for finding the anchor carrier and mechanisms for directing the WTRU to the anchor carrier.

With respect to for learning about the type of component carrier, there are several example methods. In a first example method, the information indicating the type of the component carrier is transmitted in the BCH. The WTRU reads the BCH MIB, SIB, or both MIB and SIB. The WTRU decodes the BCH, gets the information, and learns the type of the component carrier. In a component carrier configured in a mode that supports Release 8 WTRUs, the anchor carrier information may be included in an extended MIB or SIB that may not be read by Release 8 WTRUs.

Specifically, the indication of the type of the carrier may be carried in the BCH by defining a new entity similar to a MIB or SIB. The WTRU knows the location of this entity in time/frequency and reads this information in that location. The new entity may be frequency and/or time multiplexed with the Release 8 BCH entities. It may also be encoded with a new radio network temporary identifier (RNTI). This information may not result in a large overhead and is only an indication of the type of the carrier. For example, the new entity may be carried in the central x radio blocks (RBs) of the 1.25 MHz bandwidth, and on the orthogonal frequency division multiplexing (OFDM) symbol next to the physical broadcast channel (PBCH) or any other fixed timing relative to PBCH, physical synchronization channel P-SCH, etc., where x is less than 6. This indication may also be encoded in a new type of Release 8 SIB or as an extension to the existing SIBs.

The WTRU decodes the new entity which is carried on a fixed time/frequency location. After decoding the new entity, the WTRU learns the type of the component carrier. The WTRU may get this information by decoding a newly defined Release 8 SIB or an extension to one or some of the existing Release 8 SIBs.

According to another method, the WTRU performs a random access procedure on the uplink carrier or one of the uplink carriers linked with the detected downlink component carrier and gets a radio resource control (RRC) connection. The WTRU then receives the information regarding the anchor carrier through higher layer signaling if it supports carrier aggregation.

Specifically, the indication of the type of carrier and other relevant information may be transmitted to the WTRU after the RRC connection. The LTE-A WTRU locks onto a carrier and gets an RRC connection. If this carrier is also the anchor carrier, all LTE-A system information may be transmitted to the WTRU with RRC signaling. If this carrier is not the anchor carrier, the location of the anchor carrier may also be transmitted to the WTRU by RRC signaling. In this case, the WTRU learns the type of the component carrier and possibly the location of the anchor carrier with higher layer signaling. Alternatively, the RRC signaling from the non-anchor carrier will transmit all LTE-A system information, from where the WTRU will learn the anchor carrier. Note that in this RRC-based method, the anchor carrier may be either cell-specific or WTRU-specific.

The WTRU may also learn the type of the carrier during the random access procedure. For example, the type of carrier may be transmitted in message 2 or 4. The WTRU decodes the particular message and learns the type of the carrier or the anchor carrier is directly indicated in the message. Note that in this Random Access Channel (RACH)-based method, the anchor carrier may be either cell-specific or WTRU-specific.

In another method, several bits of the spare bit string may be used to indicate the type of the component carrier. The bit string is ignored by the Release 8 WTRUs, so this additional information inserted into the MIB is transparent to these WTRUs.

For example, a single bit may be used to indicate if a component carrier is the anchor carrier or not. The structure of the master information block in Release 8 is illustrated in Table 1 below. The MIB consists of the downlink bandwidth, Physical Hybrid Automatic Repeat Request Indicator Channel (PHICH) configuration and system frame number. In addition to these, there is a reserved spare bit string. Also, there are two spare codepoints in the downlink bandwidth region.

TABLE 1

MasterInformationBlock

-- ASN1START
MasterInformationBlock ::=    SEQUENCE {
dl-Bandwidth                  ENUMERATED {
                              n6, n15, n25, n50, n75, n100, spare2,
                              spare1},
phich-Configuration           PHICH-Configuration,
systemFrameNumber             BIT STRING (SIZE (8)),
spare
BIT STRING (SIZE (10))
}
-- ASN1STOP The remaining spare bits may be used to transmit some LTE-A specific system information. For example, the number of downlink component carriers, uplink component carriers, and how they are linked may be signaled with the remaining spare bits.

The remaining spare bits may also indicate where to locate the anchor carrier. If the number of the bits are not enough to indicate the absolute location of the anchor carrier, these bits may be used to indicate the RB allocation (i.e., address of a time/frequency resource) of a Physical Downlink Shared Channel (PDSCH) which contains the information of the anchor carrier location.

After successfully completing the synchronization procedure, the WTRU decodes the MIB. If the WTRU is a Release 8 WTRU, the WTRU ignores the spare bits in the MIB. If the WTRU is an LTE-A WTRU, the WTRU interprets some of the bits unused by a Release 8 WTRU in the MIB (specified as aforementioned) as the type of the component carrier. If the carrier is an anchor carrier, the WTRU knows the location of the LTE-A specific system information and reads the LTE-A specific system information. If the carrier is not an anchor carrier, the WTRU gets information that indicates the location of the anchor carrier. The WTRU may get this information by decoding some or all of the remaining spare bits. Alternatively, the WTRU will receive resource block (RB) allocation of a PDSCH that contains information of the anchor carrier location.

Another method uses a new cyclic redundancy check (CRC) masking sequence to mask the CRC of PBCH in LTE-A and the LTE-A WTRU will use the new masking sequence to decode the BCH. If the carrier is Release 8 non-backward compatible and is also the anchor carrier, (i.e. a Type 3), then this indication is implicit because the new BCH (and maybe the synchronization channel) may only be detectable by the LTE-A WTRUs. In this case, the LTE-A WTRU has to know that the BCH (or the synchronization channel) is LTE-A specific. This may be achieved, for example, by masking the BCH with a new cyclic redundancy check (CRC) masking sequence. The LTE-A uses this new CRC masking sequence to decode the BCH.

In another example method, if the anchor carrier is a Release 8 non-backward compatible LTE-A carrier (a Type 3), the LTE-A physical broadcast channel (PBCH) should be masked with a special CRC (e.g., ANCHOR_CRC) and successful decoding of such PBCH indicates the anchor carrier. In this example, the WTRU performs synchronization procedures and decodes the PBCH to obtain the information of carrier type. When decoding the PBCH, the WTRU de-masks the PBCH with corresponding CRCs. If the WTRU is a LTE-A WTRU, it will de-mask the PBCH with the special CRC (e.g., ANCHOR_CRC) and regular CRC (as in LTE Rel-8). If the CRC test succeeds with the special CRC, the anchor carrier is indicated. If CRC test fails with the special CRC but succeeds with the regular CRC, this indicates that the WTRU has not found the anchor carrier and has camped on a non-anchor component carrier. In this case, the WTRU may read the PBCH, may receive a SIB via RRC signaling and get directed to the anchor carrier if a Release 8 backward compatible carrier (Type 2) or a Type 6 carrier is the component carrier the WTRU has camped on. Further, the WTRU may continue the synchronization procedures and decode the PBCH for the next carrier. The procedure restarts with the WTRU performing the synchronization procedures and decoding PBCH for carriers.

If the WTRU is a Release 8 WTRU, it will de-mask the PBCH with the regular CRC only. The WTRU will not pass the CRC test for the carrier where the PBCH is masked with the special CRC. Therefore the WTRU will not access the LTE-A only carrier.

Disclosed are methods for directing the WTU to the anchor carrier. The WTRU is directed to the anchor carrier after the WTRU learns that the component carrier is not the anchor carrier. The WTRU is directed to the anchor carrier by either signaling in the BCH, higher layer signaling after RRC connection setup or signaling during the random access process.

In an example method, the WTRU may be directed to the anchor carrier with RRC signaling. After the WTRU gets an RRC connection, the WTRU may learn the location of the anchor carrier with higher layer signaling. After the WTRU gets this information, it moves to the anchor carrier and attempts to decode the BCH on the anchor carrier to receive the system information.

The WTRU may also learn the location of the anchor carrier during the random access procedure. For example, the location of the anchor carrier may be transmitted in message 4 and the WTRU decodes this message and learns the location of the anchor carrier.

A new entity that contains the information of the component carrier type may be employed. This entity may also carry the location of the anchor carrier. The same procedures outlined hereinabove may similarly be used by the WTRU. It may also be possible to have a new entity that only contains the location information of the anchor carrier. The WTRU learns the location of the anchor carrier by decoding this entity and then moves to the anchor carrier. This entity is not necessarily transmitted on the anchor carrier if there is a single anchor carrier.

Depending on the selected method, the directing-to-anchor-carrier mechanism may be used only on the non-anchor carriers. For example, if the type of carrier and location of the anchor carrier are coded separately and transmitted on two different entities, then the location information may need to be transmitted only on the non-anchor carriers.

The WTRU may also continue cell search until the anchor carrier is detected.

The directing command may be encoded in a new type of Release 8 SIB or as an extension to the existing SIBs. The LTE-A WTRU knows this extension SIB and learns the location of the anchor carrier by decoding this SIB or the directing command may be encoded in the Release 8 MIB by using the spare bit string.

The location of the anchor carrier and other possible information about the anchor may be transmitted in the sub-frames regarded as blank for the LTE-A WTRUs. Accordingly, after learning the location of the anchor component carrier, the WTRU moves to that carrier.

Disclosed hereinafter are example methods for transmission of the LTE-A specific system information. After the WTRU finds the anchor carrier, the new system information needs to be transmitted on the anchor carrier. The example methods for this transmission depend on whether the carrier is Release 8 backward compatible or not.

In the case of a Release 8 compatible anchor carrier, the Release 8 BCH is kept intact. The new information may be transmitted in new MIBs and SIBS or in extensions to the existing ones. Several methods for defining new MIB/SIBs or extensions to these are disclosed hereinafter.

For LTE-A, the primary broadcast channel may be extended either in the frequency domain or the time domain. As an example for frequency domain extension, N sub-carriers in addition to the current 72 sub-carriers may be used. The newly allocated subcarriers may be located either adjacent to the current center subcarriers or offset by a fixed number of sub-carriers from the center subcarriers.

As an example for time domain extension, the BCH may be transmitted on the same frequency as the Release 8 broadcast channel, however, it will be transmitted with more OFDM symbols than the current 4 for the MIB and more subframes in the SI-window for other SIBs. If such an addition/extension is used, the WTRU may know the time/frequency location of the new entity. The WTRU reads the new system information in this fixed location and decodes it to receive the LTE-A specific system information.

The LTE-A specific system information may be made as an extension to information elements (IEs) in existing Release 8 SIBs or system information messages (SIs). Different ASNI formats for Release 8 and LTE-A would enable the LTE-A WTRU RRC to receive the relevant contents. For example, the LTE-A WTRU RRC may receive the carrier specific uplink anchor information IE as the criticalExtension-Rel10 specific for LTE-A in the regular Release 8 SIB-2 and therefore act on the information to uplink access, while the criticalExtension-Rel10 is transparent to Release 8 WTRUs. Further, LTE-A specific system information may be extension SIBs which will go to a separate SI and SI-window for LTE-A only. For example, all LTE-A specific operating parameters in the cell may be made into one or more separate SIBs, i.e. SIB-12, SIB-13, with the SIB for LTE-A cell configuration and uplink access assigned to a short periodicity as is the regular Release 8 SIB-2 and the rest of the LTE-A SIBs with longer periodicities. An LTE-A WTRU accessing the Release 8 compatible carrier may read the MIB, (which will know the LTE-A cell property), then read the SIB-1 to find the overall SIB scheduling and the LTE-A specific SIBs, i.e. SIB-12 and SIB-13, based on the scheduling information found in SIB-1 for the LTE-A system information acquisition.

If the component carrier carries both Release 8 and LTE-A system information, the LTE-A WTRU may either use a new type of physical downlink control channel (PDCCH) with the existing system information radio network temporary identifier (SI-RNTI), or alternatively the LTE-A WTRU may use the same PDCCH with a different SIA-RNTI which is the new RNTI for LTE-A created and used by the relevant LTE-A WTRUs.

If the existing SI-RNTI is used to carry system information for LTE-A, a new special downlink control information (DCI) format for SI-RNTI PDCCH may be used. Currently DCI formats 1C and 1A are used for SI-RNTI for Release 8. Alternatively, an existing DCI format may be used but with different coding rate/control channel element (CCE) aggregation level, etc.

The RNTI value mapping may be changed in LTE-A to accommodate the introduction of SIA-RNTI. An example is provided in Table 2 below.

TABLE 2

RNTI Values

| Value (hexa-decimal) | | RNTI |
|---|---|---|
| FDD | TDD | |
| 0000-0009 | 0000-003B | RA-RNTI |
| 000A-FFF2 | 003C-FFF2 | C-RNTI, Semi-Persistent Scheduling C-RNTI, Temporary C-RNTI, TPC-PUCCH-RNTI and TPC-PUSCH-RNTI |
| FFF3-FFFC (or FFF3-FFFB) | | Reserved for future use |
| FFFD (or FFFC) | | SIA-RNTI |
| FFFE | | P-RNTI |
| FFFF | | SI-RNTI |

The system information for both Release 8 and LTE-A may be scheduled together in the same time and frequency domain using the current Release 8 scheduling method. This refers to the scenario disclosed herein where the SIB-12 and SIB-13 may be scheduled with the same system information (SI) window length as that in Release 8. In case the addition of LTE-A SIBs to the total SI broadcast would cause the staggering SIs to exceed the shortest periodicity span of 160 ms then the following may apply.

In an example method, frequency resource blocks (RBs) are added to the SI broadcast in the compatible carrier, so that the SI-window length may be reduced to a limit (e.g. 10) and therefore the staggering of Release 8 and LTE-A SIs at certain SFN % T=0 for all Ts, where T is periodicity, would not exceed the shortest SI periodicity, i.e. the NSIBs×W<=(the shortest SI periodicity in subframes, usually 160), where the NSIs is the total number of SIs (from SIB-2 and up, Release 8 and LTE-A) and W is the SI-window in sub-frames.

In another method, the frame offset may be added to the scheduling formula such as SFN mod T=(OFFSET-A+FLOOR(x/10)), where OFFSET-A is a LTE-A specific frame offset. Corresponding to this change, the order of the LTE-A SIs in the Release 8 scheduling information is counted with respect to the first LTE-A SI in the SIB-1 scheduling information (not the order from the first SI for Release 8). The OFFSET-A may take the value 18, if the additional LTE-A SI's do not exceed 7 (given they take SI-window<=20).

Alternatively, both methods outlined herein, i.e. keeping the SI-window short and providing an offset to LTE-A only SIs on the compatible carrier, may be used.

The MIB or SIB extensions may carry possible LTE-A cell configuration information such as the number of carriers and/or the anchor carriers, how the downlink and uplink carriers or anchor carriers are linked and their frequency locations (E-UTRA Absolute Radio Frequency Channel Number (EARFCN) numbers). The carrier frequencies may be labeled such as 1, 2, . . . , N to allow rapid identification on PDCCHs used for uplink and downlink grants. The LTE-A WTRU may use the information for uplink access on the linked uplink carrier or anchor carrier.

The information about all of the carriers may be received by the WTRU with RRC messaging as well.

The time/frequency location of the new MIB/SIBs or extensions to these is known to the WTRU. This may be achieved by allocating a fixed time/frequency location to some of these entities, for example, the MIB. This may also be achieved by informing the WTRU of the scheduling of these entities, for example, by transmitting this information in SIB1. The WTRU received these entities on the given time/frequency location decodes. To unmask the CRC, the WTRU may either use an LTE-A specific RNTI or the same RNTI as is being used in Release 8. After decoding these entities, the WTRU obtains LTE-A specific system information.

The LTE-A specific information (such as the number of transmit antennas, for example, up to eight or more), should be indicated either by existing PBCH, new MIBs or new SIBs. The PBCH is further modified to support LTE-A specific features (e.g., high order MIMO). The PBCH is illustrated in Table 3 below:

TABLE 3

CRC mask for PBCH

| Number of transmit antenna ports at eNode-B | PBCH CRC mask $<x_{ant,0}, x_{ant,1}, \ldots, x_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |
| 8 | CRC4 |

CRC4 is a PBCH CRC mask for the number of transmit antenna ports at eNodeB equal to eight. Knowledge about the number of transmit antennas helps the channel estimation and demodulation of PDCCH and physical downlink shared channel (PDSCH) downlink shared channel (DL-SCH) for the system information (SIBs) and data demodulation. Described hereinafter are examples with respect to this embodiment.

In an example, if it is a Release 8 backward compatible anchor carrier (Type 1) and only new SIBs are used to transmit LTE-A specific system information, then the first three CRC masks are used for PBCH as shown in Table 3. Information about the number of transmit antennas up to four may be indicated. Information about the number of transmit antennas up to eight may be indicated in new SIBs.

In another example, if it is a Release 8 backward compatible anchor carrier (Type 1) and new MIBs are used to transmit LTE-A specific system information, all of the four CRC masks as shown in Table 3 are used for the new PBCH. Information about the number of transmit antennas up to eight may be indicated.

In another example, if it is a LTE-A only anchor carrier (Type 3), all the four CRC masks are used for PBCH. Information about the number of transmit antennas up to eight may be indicated.

Described herein is a method for handling a Release 8 non-backward compatible LTE-A anchor carrier. In this case, a completely new broadcast channel with new MIBs and SIBs may be used. The LTE-A obtains the LTE-A specific system information by decoding these new MIBs and SIBs. The carrier may also contain multicarrier system information, new synchronization signal, paging, etc. Alternatively, for the LTE-A only anchor carrier, the LTE-A MIB and SIBs may use the frequency and time resources in the same way as they are being used in current Release 8 MIB and SIB broadcasts.

In both the Release 8 compatible and non-compatible anchor carriers, the LTE-A WTRU will act on the received system information, e.g. perform the uplink random access over a particular uplink carrier with the time and preamble selected according to the random access parameters received.

Disclosed now is a second embodiment with a single anchor component carrier and several detectable LTE-A component carriers.

In the first example embodiment, the only detectable LTE-A component carrier was the anchor carrier. However, it may be also possible that several LTE-A component carriers have the synchronization channel but they do not carry the system information on the broadcast channel. This may be used for the purpose of load balancing. In this case, the WTRU needs to learn the type of the carrier and a direction mechanism to the anchor component carrier.

If the detected carrier is Release 8 backward compatible, then the methods disclosed herein for the first example embodiment may be used.

If the detected component carrier is a Release 8 non-backward compatible LTE-A carrier, a small amount of information that contains the type of the component carrier and the location of the anchor carrier may be sent. In this case, note that the Release 8 broadcast channel is not required to be transmitted because the carrier is not backward compatible.

The indication of the type of carrier may be carried in the broadcast channel by defining a new entity similar to a MIB or SIB. The WTRU knows the location of this entity in time/frequency and reads this information in that location. The information may also be encoded with a new RNTI. This information does not result in a large overhead and is just an indication of the type of the carrier and possibly carries the location of the anchor carrier. As an example, the new entity may be carried in the central x (x is equal or less than 6) RBs of the 1.25 MHz bandwidth, and on the same OFDM symbols as the Rel-8 MIB is transmitted.

The WTRU decodes the new entity which is carried on a fixed time/frequency location. After decoding the new entity, the WTRU learns the type of the component carrier and possibly the location of the anchor carrier.

Disclosed now is a third embodiment with several anchor component carriers. There may be more than one LTE-A component carrier that carries the system information in the carrier-aggregated LTE-A cell. In this case, the component carriers may carry the same system information or they may carry possibly different system information. The RACH parameters for each anchor carrier may be different. These possibilities are disclosed herein.

In an example embodiment, all anchor carriers carry the same system information. In this case, the information about the whole system may be transmitted on each one of the anchor carriers. For example, the number of downlink and uplink component carriers, the linkage between the downlink and uplink component carriers, the random access parameters for the downlink component carriers, etc. A WTRU may learn the LTE-A specific system information by reading the broadcast channel in any one of the component carriers. Note that all the DL component carriers may be Release 8 backward compatible. In this case, the methods disclosed for the first example embodiment may be used.

Alternatively, the DL component carrier that the WTRU detects during the synchronization process may be considered as a temporary anchor carrier by the WTRU. In this case, the WTRU obtains the random access parameters from the temporary anchor carrier, including a temporary UL carrier which the WTRU will use for the RACH transmission. Temporary carrier specific IDs (RNTIs or scrambling sequences) may be applied for the respective DL and UL temporary carriers. With this method, load-balancing may be achieved within a multi-anchor-carrier cell, as WTRUs in the cell may spread/camp on different anchor carriers.

In an example embodiment, anchor carriers carry different system information. Some parts of the system information carried by the anchor carriers may be different. As an example, if there are two anchor carriers denoted as Anchor X and Anchor Y, the system information carried on Anchor X may include information about the uplink component carrier linked to this anchor carrier and possibly any other downlink component carrier linked to the same uplink component carrier. As another example, random access parameters corresponding only to Anchor X and the linked uplink component carriers, may be transmitted only on Anchor X. If there are additional downlink component carriers linked to the same uplink component carrier, random access parameters for these carriers may also be transmitted on Anchor X. Note that there may be different random access parameters for the downlink component carriers linked to the same uplink component carrier so that the NodeB may differentiate which downlink component carrier the WTRU is listening to.

In this case, the WTRU learns part of the system information by reading the broadcast channel on one of the anchor carriers. The rest of the system information may be learnt by higher layer signaling after the RRC connection is established.

It should be noted that based on the assumption that only the anchor carrier transmits the required system information including the random access parameters, the WTRU starts the random access attempt on the uplink component carrier linked to the anchor component carrier. In another method, as disclosed in the first embodiment, the WTRU may start the random access attempt on a non-anchor Release 8 component carrier and then be redirected to the anchor component carrier by RRC signaling or random access messages.

Disclosed now is a method for redirecting the WTRU to an anchor component carrier from a Release 8 carrier. To redirect a WTRU from a Release 8 non-anchor carrier to one of the anchor carriers, the methods disclosed with respect to the first phase of the first embodiment may be used. It is important to note that when there are several anchor carriers, the WTRU may be redirected from the Release 8 carrier to any one of the anchor carriers. To achieve this, the location information of all anchor carriers may be transmitted on the Release 8 carriers and the WTRU selects one of the anchor carriers. The selection may be based on a specific criterion, for example a preferred carrier frequency, best downlink link quality (such as Reference Signal Received Power (RSRP)) or the selection may be random. Further, the WTRU may be redirected from the Release 8 carrier to any one of the anchor carriers by transmitting the location of a single anchor carrier on the Release 8 carrier.

Disclosed hereinafter is a method for redirecting the WTRU to one anchor component carrier from another anchor carrier. It may be also possible that the WTRU is directed from one anchor component carrier to another anchor component carrier. This may be needed, for example, to achieve load balancing within a multi-anchor-carrier LTE-A cell. It is further noted that the LTE-A anchor is responsible for all WTRU idle mode operations. Example methods for addressing this are disclosed herein.

According to an example method, the network may direct the WTRU to another anchor carrier from the current component carrier using some kind of redirection in message 4 of the random access procedure or possibly as part of the Non-Access Stratum (NAS) messages. In this case, the WTRU decodes the message and if there is a redirection command, the WTRU moves to the anchor component carrier indicated in the command. In the command, the WTRU might receive the new anchor carrier's center frequency number, a frequency offset to the current anchor carrier, or some other means to locate the new anchor.

According to another example method, the WTRU may receive and explicit redirection command via an RRC message at connection release when the WTRU goes from connected mode to the idle state. In the command, the WTRU may receive the new anchor carrier's center frequency number, a frequency offset to the current anchor carrier, or some other means to locate the new anchor.

According to another example method, one of the MIB/SIBs may post a cell-load factor and one or more target carrier frequencies of the anchor component carriers. If the current anchor carrier's load factor is above a certain threshold (or link quality is below a threshold), the WTRU may automatically select one of the target anchor component carriers indicated in the system information and move to that carrier. This procedure applies to the idle mode.

Redirection from one anchor component carrier to another anchor component carrier may also happen in the connected mode. The methods disclosed for idle mode are equally applicable.

Disclosed hereinafter are the types of information that could be different on different anchor carriers. Each anchor carrier may carry information about the linked uplink component carrier. Further, each anchor carrier may carry information about the other downlink component carrier(s) linked to the same uplink component carrier as the anchor carrier, and each anchor carrier may carry different random access parameters. When several anchor carriers are linked to the same uplink component carrier, the same random access parameters may also be used.

Each anchor carrier may have different SIBs, especially SIB2 that includes information about radio resource configuration like MIMO configuration, uplink control channel configuration, etc. This SIB includes the random access parameters as well. Note that in LTE-A, another SIB may be used to carry this kind of information.

In the case where the LTE-A anchor carrier addresses the WTRU idle mode paging, then the paging cycle or DRX cycle length may be configured differently from anchor carrier to anchor carrier. Other idle mode paging related parameters that may be different is the "number of sub-frame occasions for paging in a paging frame", i.e., the current Ns parameter in idle mode paging and the paging sub-frame pattern definition table.

The WTRU learns these parameters and system information by reading the broadcast channel transmitted on the anchor carrier. Although there may be several anchor component carriers in an LTE-A cell, the WTRU might need to lock onto only one of them at a given time for system information purposes.

Disclosed hereinafter are methods for addressing system information modifications. When there is a change in the system information (SI), the WTRU may get notification by two example methods. In an example method, the WTRU may check the PDCCH for a particular RNTI that is used to transmit system modification commands, for example, SI-CHG-RNTI. This command may be transmitted periodically and could consist of an indication flag. The command may also indicate which particular SIBs are modified by using a bitmap provided there is an SI change. The WTRU periodically looks for the PDCCH command with a given RNTI. After successfully decoding the command, if there is an SI change, the WTRU reads the modified SIB on the scheduled time/frequency location for that SIB. In another method, the WTRU may check the paging message to see a special indicator change.

For system information modifications, the following methods may be applicable. In an example method, the paging cycle in connected mode may be the same for all of the component carriers or can be different for different component carriers when it provides paging.

In another method, when the network wants to change the system information, it may page the WTRU only on the anchor component carrier. Hence the WTRU needs to monitor its paging cycle only on the anchor component carrier.

In another method, the WTRU, depending on the paging cycle which best suits its DRX cycle, may choose the anchor carrier which it wants to monitor. The monitoring can happen in the WTRU DRX on-duration and active-time that overlaps the paging cycle on that chosen anchor carrier in order to save power.

In another method, the WTRU may calculate the system modification periods based on the anchor component carrier. The system modification period may be calculated as SFN mod N, where N may be the modification period coefficient in frames, which may be received only on the anchor component carrier.

In another method, once the WTRU receives the page, it may start receiving the new system information from the modification period. For the duration when the WTRU is receiving the new system information, the WTRU may stop listening to the other component carriers and only listen to data from the anchor component carrier simultaneously along with receiving the SIs over the BCCH.

In another method, the WTRU may also monitor the value tag of SIB-1 on the anchor component carrier so that it does not have to read the paging message on each paging cycle.

For the methods disclosed herein, if there are many anchor component carriers, the WTRU may be told which anchor component carrier the WTRU needs to listen to for system information change and/or paging. Alternatively, if all the anchor carriers are synchronized from the network perspective, then the WTRU may listen to all anchor component carriers for this information.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented by a wireless transmit/receive unit (WTRU), the method comprising:
   receiving a first radio resource control (RRC) message comprising carrier aggregation information, the carrier aggregation information comprising an indication that downlink control information for downlink transmissions on a first component carrier will be received via a second component carrier, wherein the WTRU receives, via the second component carrier, an indication of which orthogonal frequency division multiplexing (OFDM) symbols of a subframe include a physical downlink shared channel (PDSCH) region for the WTRU to decode the downlink transmissions on the first component carrier;
   receiving a physical downlink control channel (PDCCH) transmission on the second component carrier, wherein the PDCCH transmission comprises a downlink grant and an index indicating which component carrier is to be used for carrying a physical downlink shared channel (PDSCH) transmission associated with the downlink grant;
   determining the PDSCH transmission is to be received on the first component carrier based on the index included in the PDCCH transmission received on the second component carrier; and
   receiving the PDSCH transmission on the first component carrier in accordance with the downlink grant included in the PDCCH transmission received on the second component carrier.

2. The method as in claim 1, wherein the index is included in a carrier indicator field of the PDCCH transmission.

3. The method as in claim 1, wherein each of the first component carrier and the second component carrier include a respective PDCCH.

4. The method as in claim 1, wherein each of the first component carrier and the second component carrier support operation of Long Term Evolution (LTE) Release 8 WTRUs.

5. The method as in claim 1, wherein the carrier aggregation information indicates that multiple component carriers are to be scheduled via PDCCH transmissions sent on the second component carrier.

6. The method as in claim 1, wherein the second component carrier does not include a transmitted PDCCH.

7. The method as in claim 1, wherein the second component carrier is a primary component carrier for the WTRU.

8. The method as in claim 7, wherein the primary component carrier is a component carrier that the WTRU initially connected to.

9. The method as in claim 1, wherein the indication of which OFDM symbols of a subframe include the PDSCH region for the WTRU to decode the downlink transmissions on the first component carrier comprises an indication of a number of OFDM symbols that should be assumed to include control information at the beginning of the subframe.

10. The method as in claim 9, wherein the indication of the number of OFDM symbols that should be assumed to include the control information at the beginning of the of the first component carrier is transmitted via a physical control format indicator channel (PCFICH) of the second component carrier.

11. A wireless transmit/receive unit (WTRU) configured, at least in part, to:
    receive a first radio resource control (RRC) message comprising carrier aggregation information, the carrier aggregation information comprising an indication that downlink control information for downlink transmissions on a first component carrier will be received via a second component carrier, wherein the WTRU is configured to receive, via the second component carrier, an indication of which orthogonal frequency division multiplexing (OFDM) symbols of a subframe include a physical downlink shared channel (PDSCH) region for the WTRU to decode the downlink transmissions on the first component carrier;
    receive a physical downlink control channel (PDCCH) transmission on the second component carrier, wherein the PDCCH transmission comprises a downlink grant and an index indicating which component carrier is to be used for carrying a PDSCH transmission associated with the downlink grant;
    determine the PDSCH transmission is to be received on the first component carrier based on the index included in the PDCCH transmission received on the second component carrier; and receive the PDSCH transmission on the first component carrier in accordance with the downlink grant included in the PDCCH transmission received on the second component carrier.

12. The WTRU as in claim 11, wherein the WTRU is configured to refrain from attempting to decode PDCCH transmission transmitted on the first component carrier based on receiving the carrier aggregation information.

13. The WTRU as in claim 11, wherein control information for WTRUs supporting carrier aggregation and control information for WTRUs lacking support for carrier aggregation is multiplexed on the PDCCH of the second component carrier.

14. The WTRU as in claim 13, wherein the control information for WTRUs supporting carrier aggregation and the control information for WTRUs lacking support for carrier aggregation is multiplexed on the PDCCH of the second component carrier in a hybrid frequency division multiplexing (FDM)/time division multiplexing (TDM) manner.

15. The WTRU as in claim 11, wherein the index is included in a carrier indicator field of the PDCCH transmission.

16. The WTRU as in claim 11, wherein the WTRU is configured to detect the PDCCH transmission using blind decoding.

17. A base station configured, at least in part, to:
    determine that downlink control information for a first component carrier is to be transmitted to a wireless transmit receive unit (WTRU) using a physical downlink control channel (PDCCH) of a second component carrier;
    send a first radio resource control (RRC) message comprising carrier aggregation information to the WTRU, the carrier aggregation information comprising an indication that the downlink control information for downlink transmissions on the first component carrier will be sent to the WTRU via the PDCCH of the second component carrier, wherein the base station is configured to send, via the second component carrier, an indication of which orthogonal frequency division multiplexing (OFDM) symbols of a subframe include a physical downlink shared channel (PDSCH) region for the WTRU to decode the downlink transmissions on the first component carrier;
    send a PDCCH transmission to the WTRU on the second component carrier, the PDCCH transmission comprising a downlink grant and an index indicating which component carrier is to be used for carrying a PDSCH transmission associated with the downlink grant, wherein the index included in the PDCCH transmission indicates that the first component carrier is to be used by the WTRU for receiving the PDSCH transmission associated with the downlink grant; and
    receive the PDSCH transmission on the first component carrier in accordance with the downlink grant included in the PDCCH transmission received on the second component carrier.

18. The base station as in claim 17, wherein the index is included in a carrier indicator field of the PDCCH transmission.

19. The base station as in claim 17, wherein each component carrier utilized by the base station for communicating with the WTRU is scheduled using the second component carrier.

20. The base station as in claim 17, wherein the base station is further configured to send an indication to the WTRU that the downlink control information for the first component carrier will be shifted to a different component carrier.

* * * * *